US011975553B2

(12) United States Patent
Nau et al.

(10) Patent No.: US 11,975,553 B2
(45) Date of Patent: May 7, 2024

(54) THERMORESPONSIVE PAPER COATINGS BASED ON CELLULOSE DERIVATIVES

(71) Applicants: PAPIERFABRIK AUGUST KOEHLER SE, Oberkirch (DE); TECHNISCHE UNIVERSITÄT DARMSTADT, Darmstadt (DE)

(72) Inventors: Maximilian Nau, Darmstadt (DE); Markus Biesalski, Maintal (DE); Michael Horn, Offenburg (DE)

(73) Assignees: Papierfabrik August Koehler SE, Oberkirch (DE); Technische Universitat Darmstadt, Darmstadt (DE)

( * ) Notice: Subject to any disclaimer, the term of this patent is extended or adjusted under 35 U.S.C. 154(b) by 683 days.

(21) Appl. No.: 17/055,086

(22) PCT Filed: May 2, 2019

(86) PCT No.: PCT/EP2019/061187
§ 371 (c)(1),
(2) Date: Nov. 12, 2020

(87) PCT Pub. No.: WO2019/219391
PCT Pub. Date: Nov. 21, 2019

(65) Prior Publication Data

US 2021/0213769 A1 Jul. 15, 2021

(30) Foreign Application Priority Data

May 14, 2018 (DE) ..................... 10 2018 111 495.8

(51) Int. Cl.
*B41M 5/36* (2006.01)

(52) U.S. Cl.
CPC ......... *B41M 5/366* (2013.01); *B41M 2205/04* (2013.01)

(58) Field of Classification Search
CPC ........ B41M 5/36; B41M 5/361; B41M 5/366; B41M 2205/04
See application file for complete search history.

(56) References Cited

U.S. PATENT DOCUMENTS 3,031,328 A 4/1962 Larsen
3,320,089 A 5/1967 Bourgeois
(Continued)

FOREIGN PATENT DOCUMENTS

CN 101544141 A 9/2009
CN 104369564 A 2/2015
(Continued)

OTHER PUBLICATIONS

Machine translation of detailed description of JP 02-080288 acquired on Jun. 26, 2023.*
(Continued)

*Primary Examiner* — Gerard Higgins
(74) *Attorney, Agent, or Firm* — Lippes Mathias LLP

(57) ABSTRACT

The present invention relates to a heat-sensitive recording material comprising a carrier substrate, which is black or coloured on at least one side, and a thermoresponsive layer on the at least one black or coloured side of the carrier substrate, wherein the thermoresponsive layer comprises nanoparticles of at least one cellulose ester, and to a method for producing this material, and to a heat-sensitive recording material that can be obtained by this method.

15 Claims, 1 Drawing Sheet

(56) References Cited

U.S. PATENT DOCUMENTS

| | | | | |
|---|---|---|---|---|
| 6,043,193 | A | 3/2000 | Chen et al. | |
| 8,054,323 | B2 | 11/2011 | Peters et al. | |
| 2015/0049152 | A1 * | 2/2015 | La Fleur ................. | B32B 27/20 347/221 |
| 2015/0367664 | A1 | 12/2015 | Kuhne et al. | |
| 2018/0001730 | A1 | 1/2018 | Stork et al. | |

FOREIGN PATENT DOCUMENTS

| | | | |
|---|---|---|---|
| DE | 1051112 | B | 2/1959 |
| EP | 2345678 | A1 | 7/2011 |
| EP | 2678167 | B1 | 5/2015 |
| EP | 2993055 | A1 | 3/2016 |
| JP | 02080288 | A | 3/1990 |

OTHER PUBLICATIONS

Notification of Transmittal of Translation of the International Preliminary Report on Patentability for PCT Application No. PCT/EP2019/061187, dated Nov. 17, 2020, 8 pages.
Notification Concerning Transmittal of International Preliminary Report on Patentability (Chapter I of the Patent Cooperation Treaty), dated Nov. 17, 2020, 8 pages.
Office Action for Chinese Application No. 201980027372.4, dated Jul. 25, 2022, 8 pages.
Office Action for Application No. 10 2018 111 495.8, dated Apr. 8, 2019, 32 pages.
Geissler et al., "Thermo-responsive superhydrophobic paper using nanostructured cellulose stearoyl ester", Cellulose (2014), 10 pages.
Chinese Office Action for Application No. 201980027372.4, dated Jan. 11, 2022, 9 pages.

* cited by examiner

THERMORESPONSIVE PAPER COATINGS BASED ON CELLULOSE DERIVATIVES

DESCRIPTION

The present invention relates to a heat-sensitive recording material, to a method for producing same, and to a heat-sensitive recording material obtainable by this method.

Heat-sensitive recording materials comprising a carrier substrate which is black or coloured on at least one side, especially paper, synthetic paper and/or a plastics film coated on this black or coloured side with an opaque material, are known. As a result, the black or coloured carrier substrate appears white from the outside. When exposed to heat, for example localised heat from a thermal printer, the opaque coating loses opacity at these points and becomes transparent, thus making the black or coloured carrier substrate visible.

For example, EP 2 345 678 A1 discloses a heat-sensitive recording material comprising a coating of nanoparticles which have a shell and a core each made of different polymers with different glass transition temperatures.

US 8 054 323 B2 discloses a heat-sensitive recording material comprising a coating that contains an opaque polymer, for example a styrene/acrylate copolymer.

The heat-sensitive recording materials known from the prior art have the disadvantage that the structure of the heat-sensitive layer is often quite complex. For example nanoparticles, which are constructed of different layers of different polymers, have to be provided, but are complex to produce and therefore often costly. Moreover, many of the polymers used are questionable in terms of their sustainability and toxicity. Many heat-sensitive recording materials known from the prior art are also in need of improvement with regard to the sharpness and contrast of the printed image. In addition, many known heat-sensitive recording materials show inadequacies in terms of storage stability.

The aim of the present invention is to remedy the aforementioned disadvantages of the prior art. Especially, the aim of the present invention is to provide a heat-sensitive recording material comprising a thermoresponsive layer which, on the one hand, is constructed of sustainable raw materials, i.e. raw materials that are as natural and/or renewable as possible, and, on the other hand, has minimal or even no toxicity. In addition, the material of the thermoresponsive layer should be made available as simply and easily as possible. The heat-sensitive recording material should also allow a sharp and high-contrast print image and, moreover, should not be impaired, even if stored for a longer period of time. Finally, it should be possible to produce the heat-sensitive recording material by a method that is as simple and cost-effective as possible. Especially, the melting point of the substances used in the thermoresponsive layer should preferably be above 90° C., so that the process temperatures of up to 90° C. normally used during production do not have a negative influence on the product.

The above aim is addressed in accordance with the features of claim 1, i.e. with a heat-sensitive recording material comprising a carrier substrate, which is black or coloured on at least one side, and a thermoresponsive layer on the at least one black or coloured side of the carrier substrate, wherein the thermoresponsive layer comprises nanoparticles of at least one cellulose ester.

Such a heat-sensitive recording material has the advantage that the thermoresponsive layer comprises nanoparticles of modified cellulose, i.e. of at least one cellulose ester, since the cellulose ester is non-toxic and therefore essentially harmless to health. In addition, this cellulose ester is obtainable in large quantities relatively economically. The cellulose ester also has a high opacity and, for thermal printing applications, a favourable melting point and glass transition temperature. A heat-sensitive recording material comprising a thermoresponsive layer containing nanoparticles of at least one cellulose ester is also relatively easy and inexpensive to produce. It also has a high storage stability and an excellent print image. Finally, the cellulose ester has a relatively high melting point, so that the process temperatures of up to 90° C. that are usual in the production of the heat-sensitive recording material can be tolerated.

The carrier substrate of the heat-sensitive recording material according to the invention comprises at least one black or coloured side. The term “coloured side” means that the side has a colour other than white or black. In other words, the heat-sensitive recording material comprises at least one side that is not white. Embodiments in which the at least one black or coloured side has a number of different colours, even in combination with the colour black, are also possible.

The heat-sensitive recording material according to the invention is further characterised in that the thermoresponsive layer comprising nanoparticles of at least one cellulose ester is applied to this at least one side of the carrier substrate, which is not white, but coloured or black.

This thermoresponsive layer, comprising the nanoparticles of at least one cellulose ester, is preferably substantially white.

Nanoparticles of cellulose esters and production methods for same are generally known.

Usually, the alcohol groups of the cellulose are esterified first. Technically, esterifications of cellulose are preferably carried out using the corresponding acid anhydrides and a catalyst, typically sulfuric acid. In the synthesis of cellulose acetate, for example, the cellulose is initially suspended in the reaction mixture, but as acetylation progresses the cellulose becomes increasingly soluble in glacial acetic acid, which causes the homogenisation of the reaction mixture. Parallel to the optical change, the viscosity of the solution varies and provides information about the degree of substitution (DS). At the beginning, the increasing dissolution of the polymer chains leads to an increase in viscosity, which later decreases again due to degradation reactions on the cellulose backbone and thus the reduction of the chain length. The DS and the chain length therefore can be controlled online by observing the viscosity.

Other known cellulose esters are cellulose acetate propionate, cellulose butyrate and cellulose acetate butyrate, which are produced similarly to the method as described above, preferably using the corresponding acid anhydrides.

To produce the nanoparticles from the cellulose esters, they are precipitated in a non-solvent. The preferred procedure is as follows.

To produce nanoparticles, the cellulose ester is typically dissolved in a solvent, for example THF, acetone etc., so that the concentration of the cellulose ester is about 1 to 10 mg/mL. This solution is then precipitated in a non-solvent, for example a mixture of isopropanol and distilled water. Either the dissolved cellulose ester can be added to the non-solvent or, conversely, the non-solvent can be added to the cellulose ester solution. The resulting suspension is typically stirred for 12 to 24 hours to allow solvent exchange between the still swollen particles and the precipitant. At the end of the maturing process, the particles sediment into the lower quarter of the precipitation mixture and about 4/5 of the solvent mixture are separated off. The resulting suspension is centrifuged and the resulting particle slurry is rinsed with water in order to then be incorporated into coating formulations. Typical yields are between 70 and 80%.

The heat-sensitive recording material according to the invention is preferably characterised in that the nanoparticles of the at least one cellulose ester have number-averaged particle sizes of 50 to 400 nm, preferably 160-200 nm (+/−40 nm), measured by means of dynamic light scattering (DLS). Dynamic light scattering (DLS) is a method in which the scattered light from a laser is analysed on a dissolved or suspended sample. It is often used for polymers and biopolymers or nanoparticles of these polymers and biopolymers in order to determine their mean particle size. More specifically, the number-averaged particle size was determined as follows: A "Nanophox" from the manufacturer Sympatec was used. This particle size analyser uses photon cross correlation spectroscopy (a statistical analysis method based on DLS) to determine particle sizes and distributions. The temperature is kept constant during the measurement with a thermostat, typically at 20° C. Distilled water is usually used as the fluid medium. This method detects a large number of scattering events (typically adjusted by 300,000 per second over several minutes). The measured values thus obtained provide information about the Brownian molecular movement of the particles and their diffusion coefficients. The particle diameter is calculated on this basis by applying the Stokes-Einstein relationship.

The heat-sensitive recording material according to the invention is preferably characterised in that the thermoresponsive layer has a transparency, measured according to DIN 53147:1993-01, of less than 35%, preferably of less than 30%, especially preferably of less than 25%, and very especially preferably of less than 20%, especially of less than 15% or even less than 10%.

Transparency is the ability of matter to let electromagnetic waves pass through (transmission).

Opacity refers to the opposite of transparency, i.e. a lack of translucency or a lack of permeability. Opacity is the reciprocal of transmission.

The low transparency, which is preferred in accordance with the invention, has the advantage that the black or coloured side of the carrier substrate is substantially completely covered and appears at least substantially white from the outside.

The heat-sensitive recording material according to the invention is preferably characterised in that the at least one cellulose ester comprises cellulose acetate, cellulose acetate propionate, cellulose butyrate and/or cellulose acetate butyrate, preferably cellulose acetate butyrate.

These cellulose esters are especially preferred because they have glass transition temperatures (Tg) and melting temperatures (Tm) which are especially preferred for use in a heat-sensitive recording material.

The use of nanoparticles of cellulose acetate butyrate is especially preferred. Preferably, these have degrees of substitution (DS) of 0.12±0.1 for acetyl and 2.62±0.13 for butyryl groups, the number-average molar mass (Mn) is preferably 30,000 g/mol, and the Tm is around 141° C.

The heat-sensitive recording material according to the invention is preferably characterised in that the at least one cellulose ester has a Tg of 45° C. to 150° C. and/or a Tm of 100° C. to 185° C.

The values for Tg and Tm are determined in accordance with DIN 53765:1994-03 by means of differential scanning calorimetry (DSC).

In a further preferred embodiment, the heat-sensitive recording material according to the invention is characterised in that the at least one cellulose ester is contained in the thermoresponsive layer in an amount of 35 to 70% by weight in relation to the total weight of the thermoresponsive layer.

The heat-sensitive recording material according to the invention is preferably characterised in that the thermoresponsive layer also comprises polyvinyl alcohol (PVA).

The polyvinyl alcohol is preferably contained in the thermoresponsive layer in an amount of 5 to 50% by weight in relation to the total weight of the thermoresponsive layer.

Polyvinyl alcohol reduces the sample viscosity and leads to a more homogeneous coating.

It is also preferred that a small amount, preferably 0.01 to 1% by weight, especially preferably 0.05 to 0.5% by weight, and very especially preferably about 0.1% by weight of polyvinyl alcohol is already added to the precipitant during the production of the nanoparticles of cellulose esters. This has the advantage that the polyvinyl alcohol can already attach itself to the nanoparticles of cellulose esters as a protective colloid during the precipitation process.

The heat-sensitive recording material according to the invention is preferably characterised in that the thermoresponsive layer additionally comprises at least one kaolin, alkali and/or alkaline earth salt.

Preferably, the alkali and/or alkaline earth salt comprises NaCl, $CaCO_3$ and/or $CaCl_2$.

The at least one kaolin, alkali and/or alkaline earth salt is preferably contained in the thermoresponsive layer in an amount of 0.05 to 10% by weight in relation to the total weight of the thermoresponsive layer.

The addition of salt is advantageous, as the salt can compensate for the surface charges.

The heat-sensitive recording material according to the invention is preferably characterised in that the thermoresponsive layer also comprises at least one high-molecular polyelectrolyte.

The at least one high-molecular weight polyelectrolyte preferably comprises a poly(vinylamine-vinylformamide) copolymer, as obtainable for example under the trade names Lupamin 9010 or Lupamin 4500 from BASF, and/or a cationic polyacrylamide, as for obtainable for example under the trade name Percol 47 from BASF.

The at least one high-molecular polyelectrolyte is preferably present in the thermoresponsive layer in an amount of 5 to 35% by weight in relation to the total weight of the thermoresponsive layer.

The heat-sensitive recording material according to the invention is preferably characterised in that the thermoresponsive layer comprises at least one kaolin, alkali and/or alkaline earth salt as defined above and at least one high-molecular polyelectrolyte as defined above.

The heat-sensitive recording material according to the invention is further preferably characterised in that the carrier substrate comprises paper, synthetic paper and/or a plastics film.

The heat-sensitive recording material according to the invention is preferably characterised in that the thermoresponsive layer comprises at least one silicone oil defoamer, preferably in an amount of 0.05 to 5% by weight in relation to the total weight of the thermoresponsive layer.

The heat-sensitive recording material according to the invention is preferably characterised in that the thermoresponsive layer comprises at least one binder, preferably an acrylate binder, which is obtainable, for example, from BASF under the trade name Acronal S 360 D, preferably in an amount of 0.05 to 5% by weight in relation to the total weight of the thermoresponsive layer.

The heat-sensitive recording material according to the invention is preferably characterised in that the pH value of the thermoresponsive layer is 6 to 9. The pH is preferably adjusted by adding HCl or NaOH.

The heat-sensitive recording material according to the invention is preferably characterised in that the heat-sensitive colour-forming layer contains usual additives, such as stabilisers, release agents, pigments and/or brighteners.

The heat-sensitive recording material according to the invention is preferably characterised in that the thermoresponsive layer comprises polyvinyl alcohol, preferably in an amount of 30 to 60 parts by weight, and 100 parts by weight of nanoparticles of cellulose acetate butyrate, these nanoparticles of cellulose acetate butyrate being obtainable by dissolving cellulose acetate butyrate in an organic solvent, preferably in tetrahydrofuran, and precipitating the nanoparticles of cellulose acetate butyrate by adding this solution of cellulose acetate butyrate to a non-solvent, preferably to a mixture of water and isopropanol, preferably in a mixing ratio of 1 to 4, very especially preferably of 1.2 to 2.8, the non-solvent preferably being additionally polyvinyl alcohol, preferably in an amount of 0.01 to 1% by weight, especially preferably about 0.1% by weight in relation to the total amount of the non-solvent.

Preferably, this heat-sensitive recording material additionally contains 2 to 10 parts by weight of a binder, 10 to 20 parts by weight of a viscosity regulator, and 1 to 5 parts by weight of NaOH.

The applied weight per unit area of the (dry) heat-sensitive layer is preferably about 1 to about 10 g/m$^2$, preferably about 3 to about 6 g/m$^2$.

As mentioned above, the nanoparticles of at least one cellulose ester can be produced by known methods.

The nanoparticles of at least one cellulose ester are preferably produced by a method comprising the steps of (a) dissolving a cellulose ester in an organic solvent, preferably in tetrahydrofuran, and (b) precipitating the nanoparticles of at least one cellulose ester by adding the solution of the cellulose ester (a) to a non-solvent.

The method is preferably characterised in that the cellulose ester comprises cellulose acetate, cellulose acetate propionate and/or cellulose acetate butyrate, preferably cellulose acetate butyrate.

The method is further preferably characterised in that the non-solvent is water or a mixture of water and at least one organic solvent, preferably in a mixing ratio of 1 to 4, especially preferably 1.2 to 2.8, the at least one organic solvent preferably being isopropanol thereof.

The method is additionally preferably characterised in that the non-solvent additionally comprises polyvinyl alcohol, preferably in an amount of 0.01 to 1% by weight, preferably about 0.1% by weight in relation to the total amount of the non-solvent.

The nanoparticles of at least one cellulose ester thus obtained, especially the nanoparticles of cellulose acetate butyrate, usually have a mean particle diameter of about 160 to 200 nm with a standard deviation of about 40 nm (measured with DLS, as described above).

The heat-sensitive recording material according to the invention can be produced by conventional methods. Preferably, the heat-sensitive recording material according to the invention is produced by a method in which an aqueous suspension containing the starting materials of the thermoresponsive layer and having a solids content of about 15 to about 60%, or about 15 to about 65% by weight is applied to the at least one black or coloured side of the carrier substrate, the aqueous suspension being applied and dried in accordance with coating methods which produce a contour coating (curtain coater) or a levelling coating (Blade coater, squeegee).

This method is especially advantageous from an economic point of view.

If the solids content falls below a value of about 15% by weight, the economic efficiency is reduced because a large amount of water must be removed from the coating by gentle drying in a short time, which has a negative effect on the coating speed. If, on the other hand, the value of 60% by weight is exceeded, then this only leads to an increased technical effort to ensure the stability of the coating colour curtain during the coating process.

As mentioned above, it is advantageous to produce the heat-sensitive recording material according to the invention by means of a method in which the aqueous application suspension is applied with the curtain coating method preferably at an operating speed of the coating plant of at least about 400 m/min. The so-called curtain coating method is known to those skilled in the art and is characterised by the following criteria:

In the curtain coating method a freely falling curtain of a coating dispersion is formed. By free fall, the coating dispersion, which is in the form of a thin film (curtain), is "poured" onto a substrate in order to apply the coating dispersion to the substrate. Document DE 10196052 T1 discloses the use of the curtain coating method in the production of information-recording materials, including heat-sensitive recording materials.

Setting the operating speed of the coating plant to at least about 400 m/min has both economic and technical advantages. The operating speed is especially preferably at least about 750 m/min, very especially preferably at least about 1000 m/min, and very especially preferably at least about 1500 m/min. It was especially surprising that, even at the latter speed, the heat-sensitive recording material obtained is not impaired in any way, and that, even at this high speed, the operation runs optimally.

In a preferred embodiment of the method according to the invention, the aqueous deaerated application suspension has a viscosity of about 150 to about 800 mPas (Brookfield, 100 rpm, 20° C.). If the viscosity falls below a value of about 150 mPas or exceeds the value of about 800 mPas, this leads to poor runnability of the coating mass at the coating unit. The preferred viscosity of the aqueous deaerated coating suspension is especially preferably about 200 to about 500 mPas.

In a preferred embodiment, the surface tension of the aqueous application suspension can be adjusted to 25 to 60 mN/m, preferably to about 35 to about 50 mN/m (measured according to the static ring method according to Du Noüy, DIN 53914, 1997-07), in order to optimise the method.

It is advantageous to subject the dried thermoresponsive layer to a smoothing treatment. It is advantageous here to adjust the Bekk smoothness, measured according to DIN 53107 (2000), to about 100 to about 1200 sec, preferably to about 300 to about 700 sec. Bekk smoothnesses of 100 to 300 sec are measured according to method A of DIN 53107 (2000), and Bekk smoothnesses of over 300 are measured according to method B of DIN 53107 (2000).

The preferred embodiments described in conjunction with the heat-sensitive recording material also apply to the method according to the invention.

The present invention also relates to a heat-sensitive recording material obtainable by the above-mentioned method.

Top: laser power 80%

Bottom: laser power 70%

Left: Without thermal treatment

Right: With thermal treatment (30 min at 70° C.)

Figure 2:
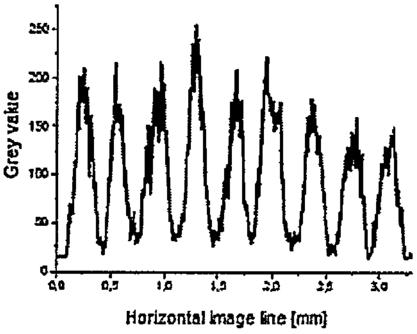

FIG. 2 shows an illustration of the opacities. These are the grey values of a horizontal line. The laser power was 70%. The grey value is a value between 0 and 255, where 255 reflects a completely black pixel and 0 reflects a completely white pixel.

The invention will be explained in detail below using unrestricted examples.

EXAMPLES

Formulation 1

An aqueous coating suspension was prepared by mixing 100 parts of nanoparticles of cellulose acetate butyrate having an average particle diameter of about 170 nm (±40 nm), which were precipitated as described above in the presence of 0.1% polyvinyl alcohol, with THF as solvent and a water/isopropanol mixture in a ratio of 1.2 to 2.8 as non-solvent, with 40 parts polyvinyl alcohol, 5 parts Styronal D 517 as binder, 15 parts Sterocoll as viscosity regulator and 3 parts 1M NaOH.

For the coating formulation, a ratio of 11.75 weight % solid/liquid was chosen. This value was chosen because, after production, the particles were present as a ~15% by weight suspension. The solids contents of the additives and coatings were determined with a dry balance. The polyvinyl alcohol used was polyvinyl acetate saponified to 84% (Mn 100,000 g/mol). In a typical test formulation, the sample vessels were filled with 100 mg nanoparticles of cellulose acetate butyrate, the respective additives were added and the solids content (SC) was adjusted to 11.75% by weight with distilled water. The formulation was then homogenised using a vortex shaker and ultrasonic bath. The coating was applied with the help of an automatic film applicator from BYK Additives & Instruments to a Hostaphan film type RNK 50.0 2600, pre-coated for line application. 100 mm $min^{-1}$ was selected as the feed speed, and 90 μm as the squeegee gap.

Heat-sensitive recording materials were produced, with the application rate of the thermoresponsive layer being 2.5, 4 and 6 $g/m^2$.

After the paper coatings were prepared and dried at room temperature, the coated substrates were cut in half with scissors. One half of a substrate was placed for 30 min in a drying oven at 70° C. to simulate simple drying conditions. Then, both samples were "printed" with a 30-watt $CO_2$ laser (parameters in Tab. 1).

Here, 10 different amounts of energy (0.43-4.3 $mJ/mm^2$) were deposited, and with each amount of energy 12 lines were written ("printed") into the coating.

These two samples were examined in more detail using a light microscope.

A light microscope in transmitted light mode was used to analyse the prints.

The evaluation was carried out with the Open Source image analysis program Im-ageJ. The brightness was adjusted in such a way that the brightest areas did not overload the sensor. Based on the grey values, relative opacities between the melted and untreated areas could be calculated.

TABLE 1

$CO_2$ laser printing parameters

| Parameters | Laser settings |
|---|---|
| Line spacing [mm] | 0.35 |
| Height [mm] | 4.2 |
| Width [mm] | 10.33 |
| Power [%] | 10-100 |
| Deposited energy [$mJ/mm^2$] | 0.43-4.3 |
| Frequency [Hz] | 100 |
| Speed [mm/s] | 20,000 |
| Print time [ms]. | 803 |

Figure 1:
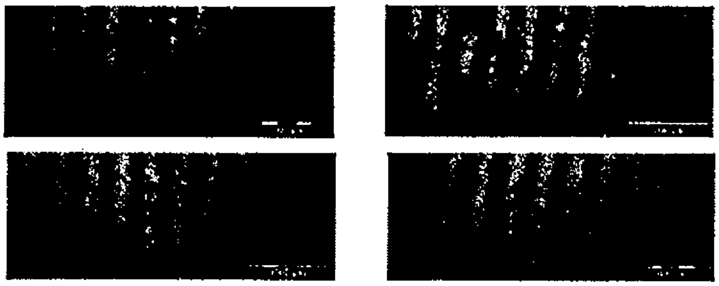
FIG. 1 shows images recorded by light microscopy of a printed heat-sensitive recording material according to the invention.

Under the light microscope, the paper coatings of formulation 1 showed promising results, as can be seen in FIG. 1. As already noted in the coating formulation, the patterns are macroscopically very homogeneous. With a laser power of 70%, sharp fine profiles could already be seen. Increasing the laser power to 80% reduces the distance between the individual lines.

FIG. 2 serves to illustrate the opacities. These are the grey values of a horizontal line. The relative opacity of PVA coatings reached peak values of up to 95%. The thermal treatment showed no negative influence.

The invention claimed is:

1. Heat-sensitive recording material comprising a carrier substrate which is black or coloured on at least one side, and a thermoresponsive layer on the at least one black or coloured side of the carrier substrate, wherein the thermoresponsive layer comprises nanoparticles of at least one cellulose ester comprising cellulose acetate butyrate, and wherein the nanoparticles have a number-average particle size of 50 to 400 nm, measured by means of dynamic light scattering (DLS).

2. Heat-sensitive recording material according to claim 1, characterised in that the thermoresponsive layer has a transparency, measured according to DIN 53147:1993-01, of less than 35%.

3. Heat-sensitive recording material according to claim 1, characterised in that the at least one cellulose ester further comprises cellulose acetate, cellulose acetate propionate, and/or cellulose butyrate.

4. Heat-sensitive recording material according to claim 1, characterised in that the at least one cellulose ester has a Tg of 45° C. to 150° C. and/or a Tm of 100° C. to 185° C. determined according to DIN 53765:1994-03.

5. Heat-sensitive recording material according to claim 1, characterised in that the at least one cellulose ester is contained in the thermoresponsive layer in an amount of 35 to 70% by weight in relation to the total weight of the thermoresponsive layer.

6. Heat-sensitive recording material according to claim 1, characterised in that the thermoresponsive layer additionally comprises polyvinyl alcohol.

7. Heat-sensitive recording material according to claim 6, characterised in that the thermoresponsive layer comprises 5 to 50% by weight of the polyvinyl alcohol in relation to the total weight of the thermoresponsive layer.

8. Heat-sensitive recording material according to claim 1, characterised in that the thermoresponsive layer additionally comprises at least one of a kaolin, or an alkali and/or alkaline earth salt.

9. Heat-sensitive recording material according to claim 1, characterised in that the thermoresponsive layer additionally comprises a poly(vinylamine-vinylformamide) copolymer or a cationic poly-acrylamide polyelectrolyte.

10. Heat-sensitive recording material according to claim 9, characterised in that the poly(vinylamine-vinylformamide) copolymer or the cationic poly-acrylamide is in an amount of 5 to 35% by weight in relation to the total weight of the thermoresponsive layer.

11. Heat-sensitive recording material according to claim 1, characterised in that the carrier substrate comprises paper, synthetic paper and/or a plastics film.

12. Heat-sensitive recording material according to claim 1, characterised in that the thermoresponsive layer comprises 0.05 to 10% by weight of at least one of a kaolin, or an alkali and/or alkaline earth salt in relation to the total weight of the thermoresponsive layer.

13. Heat-sensitive recording material according to claim 12, characterised in that the alkali and/or alkaline earth salt is selected from NaCl, $CaCO_3$ and/or $CaCl_2$.

14. Method for producing a heat-sensitive recording material comprising applying an aqueous suspension having a solids content of 15 to 65% by weight and containing nanoparticles of at least one cellulose ester comprising cellulose acetate butyrate to a black or coloured side of a support substrate, the aqueous suspension being applied and dried according to coating methods which produce a contour coating or a levelling coating, and wherein the nanoparticles have a number-average particle size of 50 to 400 nm, measured by means of dynamic light scattering (DLS).

15. Heat-sensitive recording material obtained by the method according to claim 14.

* * * * *